United States Patent [19]
Reuhl

[11] Patent Number: 5,288,172
[45] Date of Patent: Feb. 22, 1994

[54] WATER JET SYSTEM FOR TRENCHING OF PIPELINES

[75] Inventor: Gerald G. Reuhl, Houston, Tex.
[73] Assignee: Cal Dive International, Houston, Tex.
[21] Appl. No.: 57,608
[22] Filed: May 5, 1993

Related U.S. Application Data

[63] Continuation of Ser. No. 952,464, Sep. 28, 1992, abandoned, which is a continuation-in-part of Ser. No. 706,196, May 28, 1991, abandoned.

[51] Int. Cl.⁵ .............................. F16L 1/16
[52] U.S. Cl. ........................... 405/163; 37/344
[58] Field of Search .......... 405/73, 74, 159, 160, 405/161, 162, 163; 37/323, 342, 343, 344

[56] References Cited

U.S. PATENT DOCUMENTS

| | | | |
|---|---|---|---|
| 2,852,868 | 9/1958 | Talbott et al. | 37/78 |
| 3,638,439 | 2/1972 | Niederer | 61/72.4 |
| 3,657,829 | 4/1972 | Lovelace | 37/63 |
| 3,926,003 | 12/1975 | Norman | 61/72.4 |
| 3,995,439 | 12/1976 | Hahlbrock | 405/161 |
| 4,087,981 | 5/1978 | Norman | 61/72.4 |
| 4,114,390 | 9/1978 | Van Steveninck et al. | 405/163 |
| 4,117,689 | 10/1978 | Martin | 405/163 |
| 4,274,760 | 6/1981 | Norman | 405/163 |
| 4,389,139 | 6/1983 | Norman | 405/163 |
| 4,488,836 | 12/1984 | Cour | 405/159 |
| 4,516,880 | 5/1985 | Martin | 405/160 |
| 4,615,645 | 10/1986 | Langner | 405/159 |
| 4,812,079 | 3/1989 | Johnson et al. | 405/164 |
| 4,877,355 | 10/1989 | Van Pelt | 405/159 |

*Primary Examiner*—David H. Corbin
*Attorney, Agent, or Firm*—Merchant, Gould, Smith, Edell, Welter & Schmidt

[57] ABSTRACT

A water jet system for trenching of a cable or a pipe below the floor of a river, lake, gulf or ocean bottom. Two opposed water jet legs are carried on a carriage forward of venturi tubes for disposing of the trenched bottom. The carriage includes a hydraulically powered track system for advancing along the length of the cable or pipeline. The water jets are a plurality of nozzles mounted in a rotating tube at different angular directions. When the nozzle tube rotates within the housing and the nozzles pass by different openings at different heights, the jets' high pressure water shoot forth. The high pressure action of the streams of water loosen the sediment below the floor of the body of water, which is subsequently carried away by air or water action through venturi tubes which are positioned behind the jet legs. The jet legs and carriage are positioned, controlled and powered from a work vessel on the surface of the water.

23 Claims, 16 Drawing Sheets

WATER JET SYSTEM FOR TRENCHING OF PIPELINES

CROSS REFERENCES TO CO-PENDING APPLICATIONS

This is a continuation of application Ser. No. 07/952,464, filed Sep. 28, 1992, now abandoned, which is a continuation-in-part of application Ser. No. 07/706,196, filed May 28, 1991, now abandoned.

BACKGROUND OF THE INVENTION

1. Field of the Invention

The present invention pertains to a trenching system for trenching of pipelines, into a floor of a river, lake or ocean, and more particularly, pertains to water jet systems supported on a carriage with a track system for movement along a pipeline, flexible pipeline or cable.

2. Description of the Prior Art

Prior art pipe trenching systems have been complicated, bulky structures usually requiring the presence of a diver during an operation. The prior art systems have moved slowly along the cable or pipe during a trenching procedure.

Representative pipe trenching apparatus include that of U.S. Pat. Nos. 3,926,003; 4,087,981; and 4,274,670. These patents are representative of the prior art structures.

The present invention overcomes the disadvantages of the prior art by providing a water jet system for trenching of a pipeline, which provides optimum performance with some or minimal diver attention.

SUMMARY OF THE INVENTION

The general purpose of the present invention is a water jet system which directs streams of water under pressure through nozzles at various angles on a rotating member for moving sediment, such as sand, mud, silt, dirt, or calcified debris from below the bottom of the floor of a river, lake, gulf or ocean, and for creating a trench for the burying of a pipeline, flexible pipeline or cable. Today's regulations require the trenching and burying of pipes in water depths of less than two hundred feet. This water jet system provides for trenching and burying of a pipe, and further requires some or minimal diver supervision. The water jet system is supported on a carriage system which travels on a track which conforms and tracks to the top of the pipe. All of the moving parts of the water jets are internally located. The external design is free of protrusions or edges which will snag or damage the pipes or cables to be buried.

According to one embodiment of the present invention, there is provided a jet leg including a housing with one or a plurality of openings, a recessed rotating nozzle tube with recessed receptacles coinciding in proximity to the openings, recessed nozzles which are fitted into the recessed receptacles, and spacers about each opening to substantially minimize or negate any water flow through the nozzles when the nozzles are not aligned with the openings. The openings can also be defined as an open window. The opening or open window acts as a switch to turn the nozzle on, because when the nozzle is not within the opening or open window, very little if any fluid can pass because of the engaging relationship of the inner cylinder with the nozzle and the spacer. Each recessed nozzle directs water out under pressure through the openings. The nozzles can be easily interchanged and have orifices of predetermined shape and sizes. Each receptacle is fixed into the rotating tube at a predetermined proximity and a predetermined angle to direct water jet streams through the interchangeable nozzles at predetermined proximities and angles. Essentially, the rotating tube causes the nozzles to turn on when aligned within the open area of an opening, and to essentially turn off by engagement with the spacer about each opening when not within the open area of the opening. The rotating nozzle tube is driven by a hydraulic arrangement of a sprocket assembly or worm gear assembly through a coupling to a hydraulic motor. The rotational speed of the rotating tube can be varied by applying appropriate hydraulic control to the hydraulic motor so that dwell may be varied as required. One, two or more jet legs are attached to a carriage which includes traction lugs which conform to a pipe circumference on an endless chain. The endless chain is driven by a hydraulic motor about sprockets, and essentially drives the traction lugs along the top of a pipe. Water eductors or air lifts evacuate debris from the ditch formed by the water blasting by the water jet legs. The carriage is deployed from a vessel, and the high pressure water, the hydraulic power, and any air or water power for the venturi may be supplied from the vessel or incorporated into the track system. Pressures and volumes are suitably chosen for each particular burying job.

Significant aspects and features of the present invention include a water jet leg with a plurality of openings and a plurality of rotating nozzles acting as ports aimed at different directions for the trenching of river, lake, gulf or ocean bottoms for burying of a pipeline. Particularly, the nozzles can be changed relatively quickly.

Another significant aspect and feature of the present invention is a carriage device which maintains traction on and tracks the pipe and can move in both directions as may be required. The tracks of nonscuffing, high traction, tactile composition are secured to an endless chain or chains to distribute the weight of the jet legs, the venturi tubes, as well as the carriage itself, over a finite length of the pipe. The distributed weight is desirable so as not to stress the pipe, especially at the pipe welds between the sections of the pipe.

A further significant aspect and feature of the present invention is a pipeline trenching system which requires some diver supervision. Underwater video cameras can be positioned about the trenching system, or in the alternative, can be affixed to the front of the carriage system of the trenching system for monitoring the trenching activities. The system itself is of a novel assembly of components providing optimum operation and also a minimum number of components to require maintenance during operation. The moving mechanisms are hydraulically powered. The nozzles operate under water pressure and have holes of such a size that it is unlikely that the nozzles will clog.

The water jet system is capable of trenching for cables or pipes from 2 inches to 48 inches or larger, and is only limited by the size of the tracks and by the length of the jet legs, venturis or eductors, and the volume and pressure of the water supply.

Having thus described embodiments of the present invention, it is a principal object hereof to provide a water jet leg system and a carriage system of a trenching system for carrying of the water jet legs for trenching of a pipeline.

One object of the present invention is a pipeline, which are 2 to 48 inches, where the carriage can travel at adjustable rates of speed along the top of the pipeline.

Another object of the present invention is an efficient water jet leg system where the cutting speed is controllable and adjustable.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
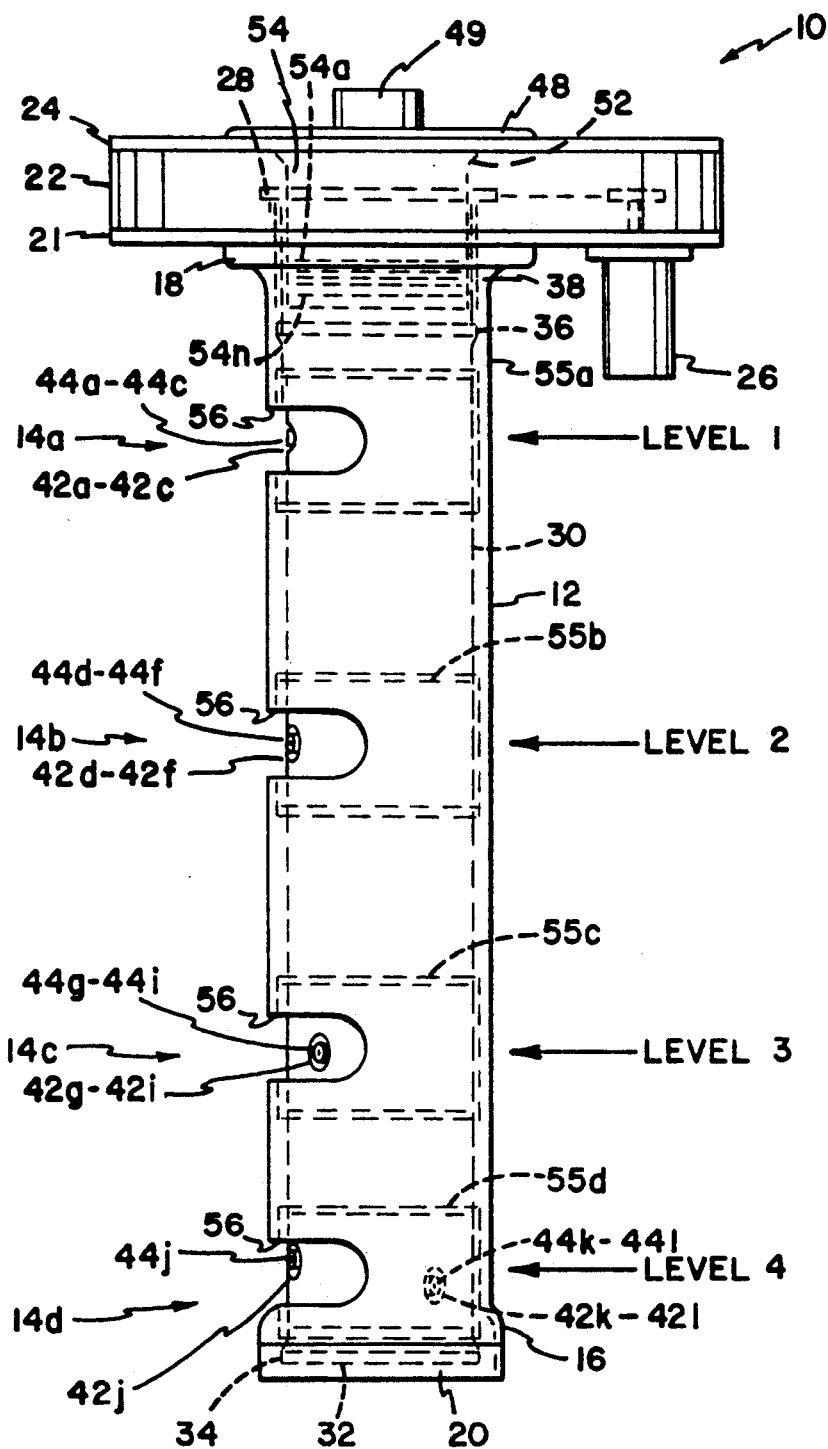
FIG. 1 illustrates a side view of a water jet or water jet leg.
Figure 3:
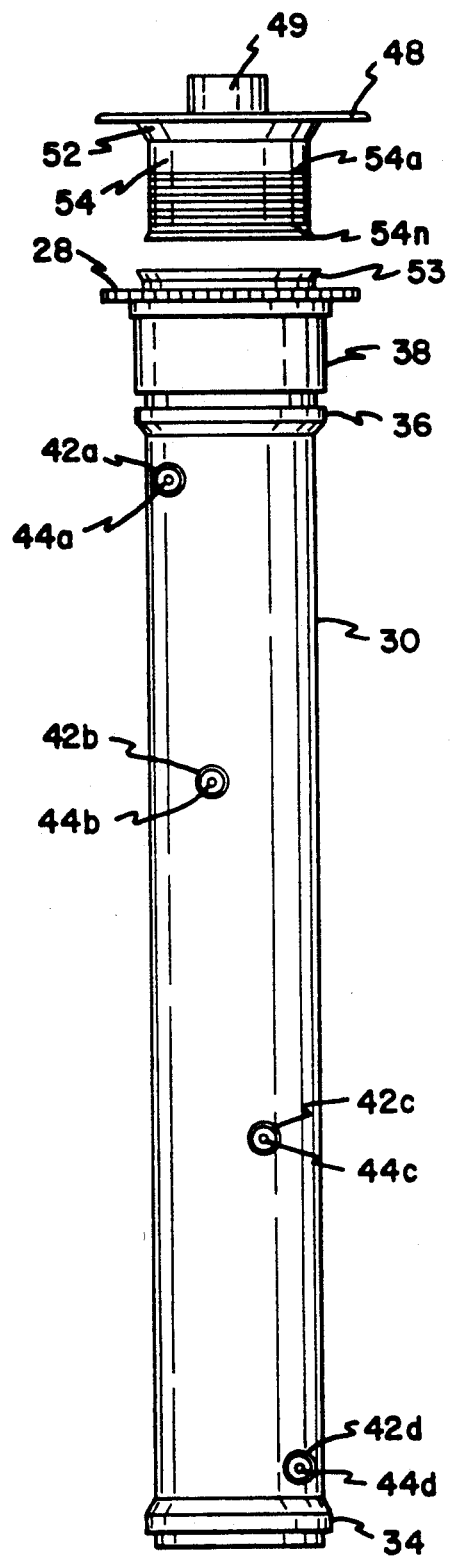
FIG. 3 illustrates a side view of the rotating nozzle tube.

FIG. 1 illustrates a side view of a water jet 10 for the trenching of a ditch into the floor of a river, lake, gulf or ocean for burying of a large cable, or more preferably a pipeline. The water jet 10 includes a cylindrical housing 12 with a plurality of spaced openings, including a plurality of openings 14a-14d as later described in detail, a lower flange 16, and an upper flange 18. A bearing cap 20 secures to the lower flange 16. A drive housing bottom plate 21, a drive housing 22, a drive housing top plate 24, and a top cap 48 secure to the upper flange 18. A hydraulic motor 26 mounts to the drive housing bottom plate 21. The hydraulic motor 26, through a chain driver or worm drive, drives a gear/sproket 28 secured to a hollow rotating tube 30, which rotates within the cylindrical housing 12, as now described in detail. As also illustrated in FIG. 3, the hollow rotating tube 30 is a cylindrical member closed at a lower end 32, and includes a lower water gasket 34 and an upper water gasket 36. An upper water gasket 38 positions between the gear/sproket 28 and the upper water gasket 36. Suitable tapered races support and align the rotating tube 30 in the cylindrical housing 12. A plurality of nozzle receptacles, including a plurality of nozzle receptacles 42a-42l are positioned at a plurality of levels 1-4 of the cylindrical housing 12 and rotating tube 30. The interchangeable threaded nozzles 44a-44l can be suitable bolts, such as stainless steel bolts, with holes of various shapes and sizes machined through the bolts. The proximity of the nozzle receptacles 42a-42l and nozzles 44a-44l at levels 1, 2, and 3 are centered with respect to the openings 14a-14d, and at level 4 the nozzles 44j-44l are spaced at different elevational levels within opening area 14d during different degrees of rotation of the rotating nozzle tube 30. The nozzle receptacles 42a-42c and the nozzles 44a-44c align at the same elevation at level 1 in opening 14a during different degrees of rotation, and are spaced at 120° intervals about the circumference of the rotating nozzle tube 30. A 120° radial orientation is used by way of illustration and example only and not to be construed as limiting to the scope of the present invention, whereas any desirable and suitable orientation may be incorporated. In the same manner, the nozzle receptacles 42d-42f and nozzles 44d-44f align at the same elevation at level 2 in opening 14b during different degrees of rotation, and are also spaced at 120° intervals about the circumference of the rotating nozzle tube 30. Nozzle receptacles 42g-42i and nozzles 44g-44i align in the same manner as described above at level 3. Nozzle receptacle 42j and nozzle 44j align at an upper elevation in opening 14d at level 4, and nozzle receptacles 42k-42l and nozzles 44k-44l align at a lower elevation in opening 14d at level 4 during different degrees of rotation. Level 4 is further designated as upper level 4a and lower level 4b as later described in detail. Generally speaking, only one of the nozzles at each level is aligned in its respective opening at any one time. A plurality of spacers 55a-55n are provided about each of the openings for substantially closing each of the nozzles 44a-44l when the nozzles are not within the open area of the openings 14a-14d. In the alternative, the spacers 55a-55n can be integral to the outer housing or can be promontory on the inner rotating nozzle tube 30. Openings 14a-14d are illustrated in vertical alignment by way of example and illustration only and shall not be construed to be limiting of the scope of the present invention, whereas the openings 14a-14d may be vertically aligned and oriented with respect to one another as desired and required. A top cap 48 includes a threaded water hose connection 49 for a high pressure/high flow source of water, and a tapered bearing 52 which engages into the race 53 of the rotating nozzle tube 30, and includes a plurality of ringed labyrinth structures 54a-54n acting as O-rings or gaskets for maintaining water pressure within the rotating nozzle tube 30. The top cap 48 and the tapered bearing 52 are also illustrated in FIG. 3.

Figure 2:
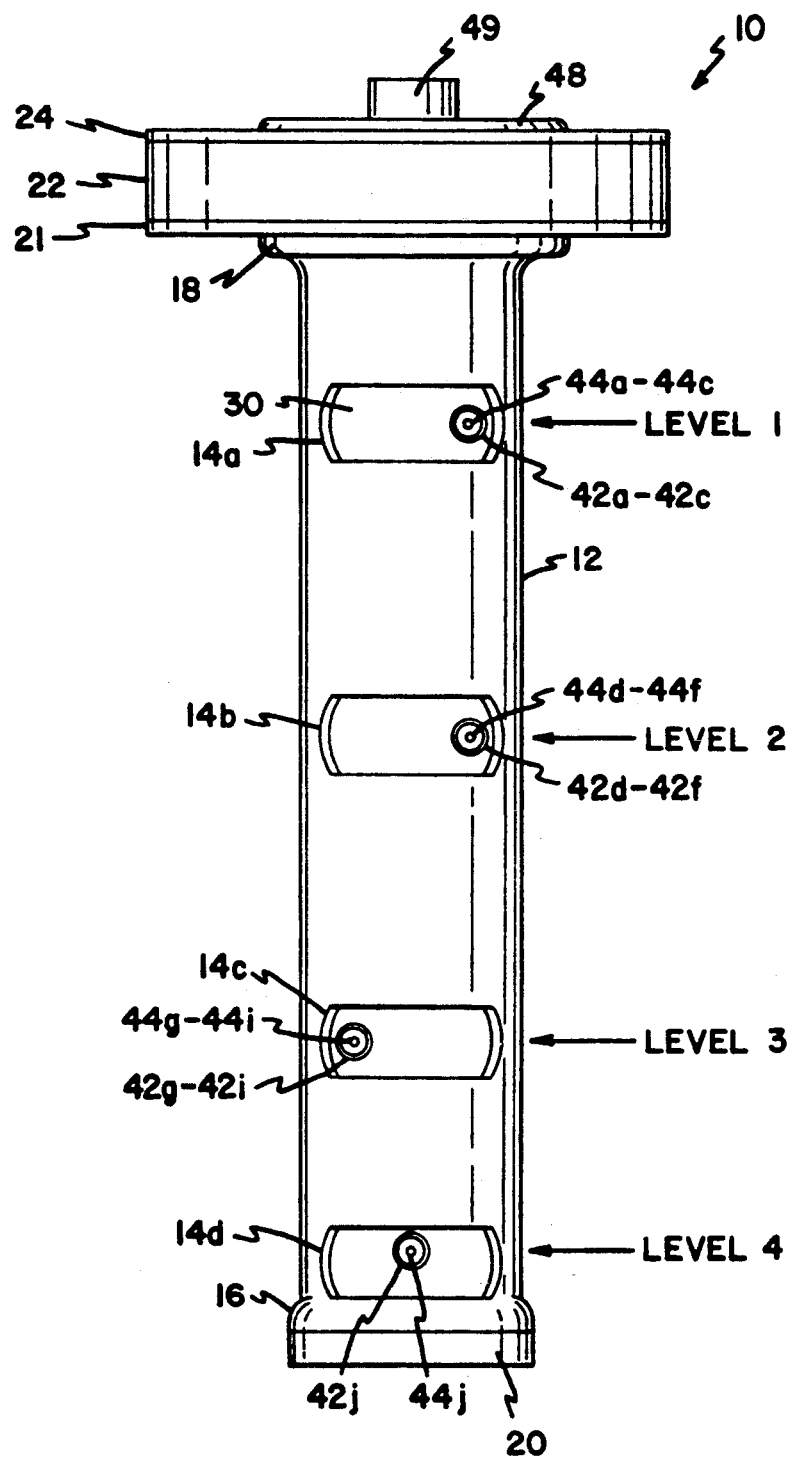
FIG. 2 illustrates a front view of the water jet.

FIG. 2 illustrates a front view of the present invention where all numerals correspond to those elements previously described.

FIG. 3 illustrates a plan view of the rotating nozzle tube 30 where all numerals correspond to those elements previously described. Illustrated in particular is the upper cylindrical water gasket 3 at the upper portion of the rotating tube 30 which aligns and is in the upper portion of the cylindrical housing 12. The top cap 48 is also illustrated including a tapered bearing 52 and the ringed structures 54a-54n about the circumference of the bushing 54. Upper and lower gaskets 36 and 34 align about the upper and lower circumference of the rotating nozzle tube 30 to rotationally seal against the inner surfaces of the cylindrical housing 12.

Figure 4:
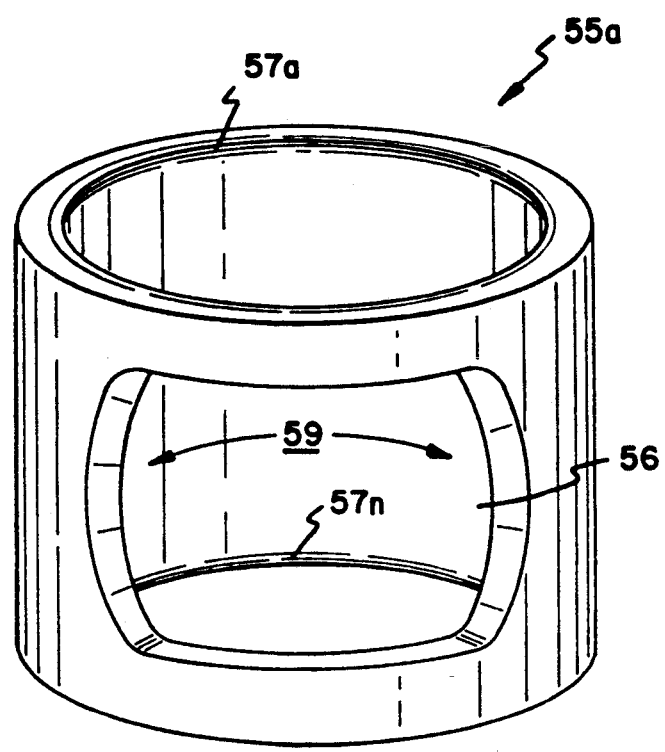
FIG. 4 illustrates a perspective view of a spacer.

FIG. 4 illustrates a perspective view of the spacer 55a including a spacer opening 56 in the spacer which coincides and aligns with the opening 14a in the cylindrical housing 12. Grooved surfaces 57a and 57n at the upper and lower inner circumferences can accommodate optional O'ring seals, which contain the flow between the optional O'ring seals which can align in the grooved surfaces 57a-57n. The wide inner middle circumferential area 59 between the edges of the opening of the opening 56 seals off water flow from the nozzle 44a and other nozzles aligned with level 1. Similar spacers 55b-55d align with openings 14a-14d along the levels 1-4.

Figure 5A:
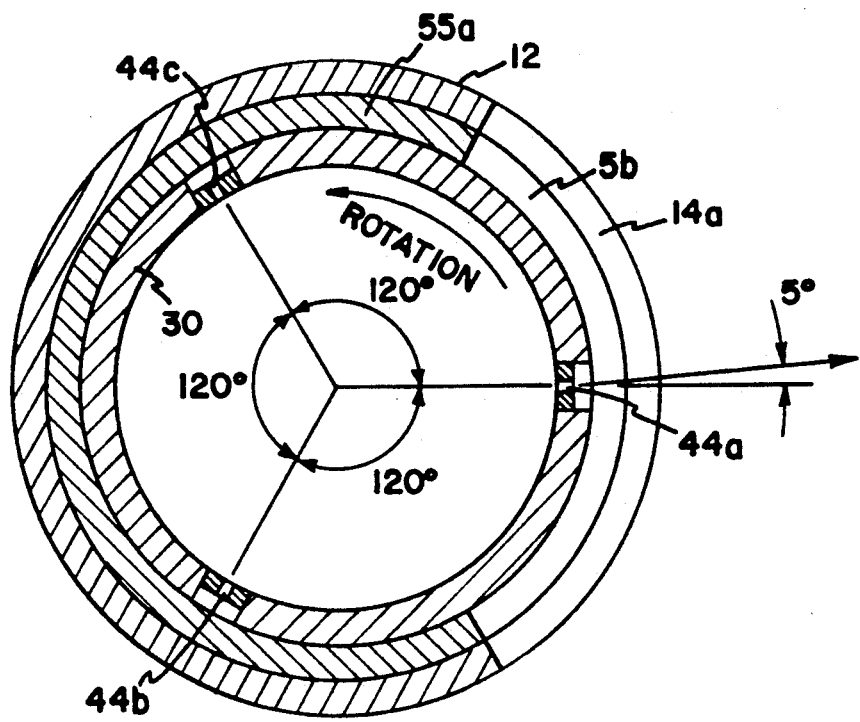
FIGS. 5A-5B through 8A-8B illustrate cross-sectional embodiments of nozzle placement and angular direction and vertical direction of the nozzles.

FIGS. 5A-5B, 6A-6B, 7A-7B, and 8A-8B illustrate, by way of example and for purposes of illustration only and not to be construed as limiting of the present invention, one particular cross-sectional embodiment of nozzle placement and angular direction and vertical direction of each of the nozzles at various levels. All numerals correspond to those elements previously described. One or more nozzle and spacer combinations is located in each water jet leg 10. The nozzles 44a-44l are illustrated showing their position in one point of time during counter clockwise horizontal rotation from left to right of the rotating nozzle tube 30, and rotate along the horizontal. FIGS. 5A, 6A, 7A, and 8A each show the relative position of the nozzles 44a-44l with relation to each other, to the respective openings 14a-14d, and to each spacer opening 59 in the spacers 55a-55d. The horizontal jet stream direction from each nozzle 44a-44l is canted 5° toward the direction of rotation as indicated in FIGS. 5A, 6A, 7A, and 8A. Water under pressure enters the lumen of the rotating tube 30 to be forced out of the nozzles 44a-44l. The configuration at level 1 is illustrated in FIG. 5A where streams of water forcefully flows from nozzle 44a, but cannot flow from the nozzles 44b and 44c which are blocked by the inner surface of the spacer 55a, or any other suitable restriction device. FIGS. 5B, 6B, 7B, and 8B illustrate the same concept at levels 2, 3 and 4 where each successive set of nozzles are azimuthally staggered from the level above.

FIGS. 5B, 6B, 7B, and 8B illustrate the vertical component of jet stream levels 1-4 with respect to the horizontal plane. The spray angle components are generally horizontal (0°), 35° pitch up from horizontal, or 35° pitch down from horizontal, but can be of various pitches as indicated or any other desired angle or pitch and shall not be construed as limiting to the scope of the invention.

FIG. 5A illustrates the orientation of the nozzles 44a, 44b and 44c with respect to the openings 14a and 56 at level 1. Nozzles 44b and 44c are blocked by the spacer 55a while nozzle 44a is unblocked allowing for pressurized flow of water through the openings 14a and 56. As the rotating nozzle tube 30 rotates in a counterclockwise motion, each successive nozzle is allowed to pass water, of course, each at a different pitch angle, while the flow from the previous nozzle is shut off by the spacer 55a.

Figure 5B:
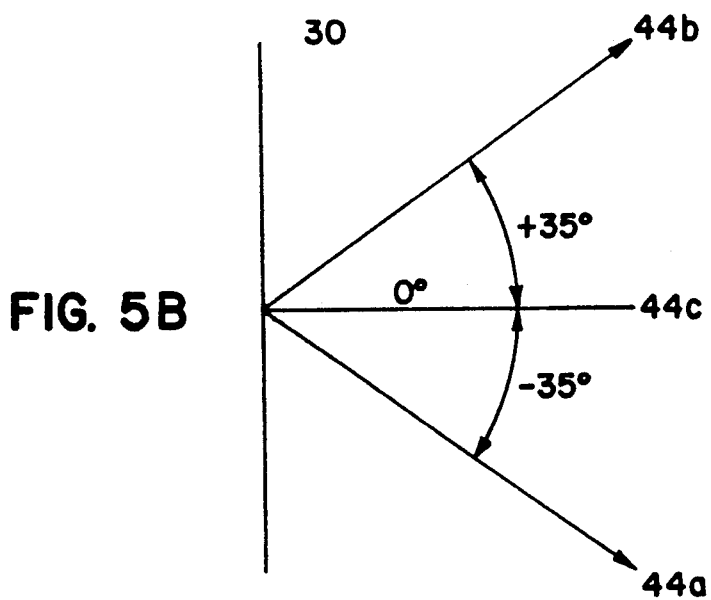

FIG. 5B illustrates the vertical pitch components of pressurized water flow of each of the nozzles 44a, 44b and 44c as each is allowed to flow by disengagement from the inner surfaces of the spacer 55a. Nozzle 44a streams at −35°, nozzle 44b streams at +35°, and nozzle 44c streams at 0°.

Figure 6A:
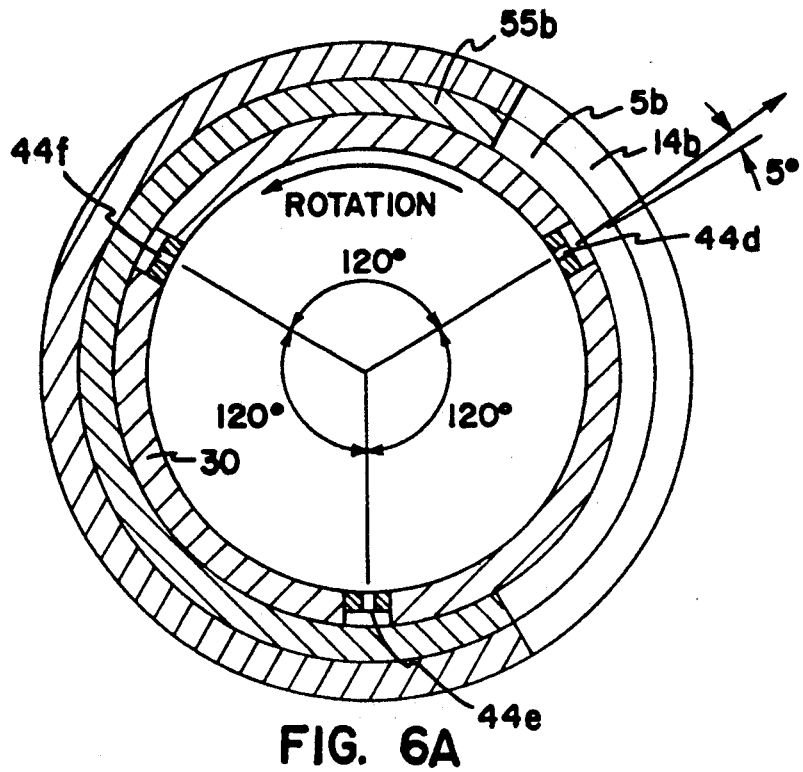

FIG. 6A illustrates the orientation of the nozzles 44d, 44e and 44f with respect to the openings 14b and 56 at level 2. Nozzles 44e and 44f are blocked by the spacer 55b, while nozzle 44d is unblocked allowing for a pressurized stream of water through the openings 14b and 56 via the directional sized nozzle 44d.

Figure 6B:
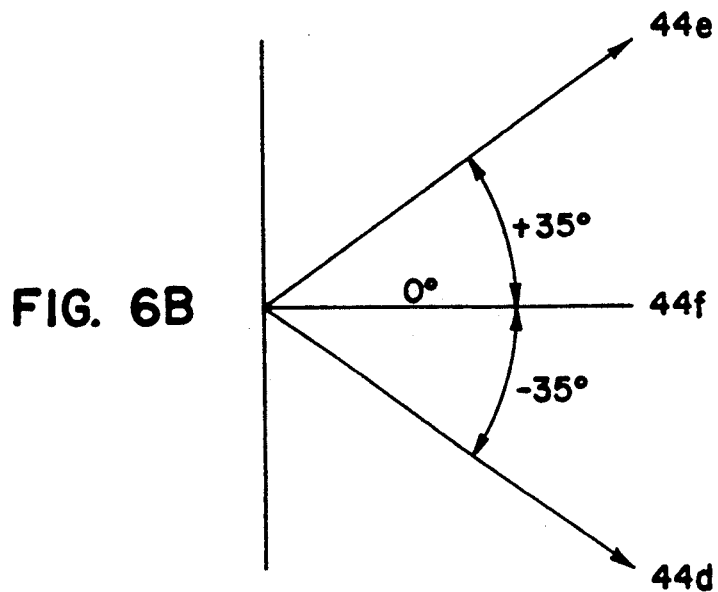

FIG. 6B illustrates the vertical or pitch components of pressurized water flow of each of the nozzles 44d, 44e and 44f as each is allowed to flow by disengagement from the inner surfaces of the spacer 55b. Nozzle 44d streams at −35°, nozzle 44e streams at +35°, and nozzle 44f streams at 0°.

Figure 7A:
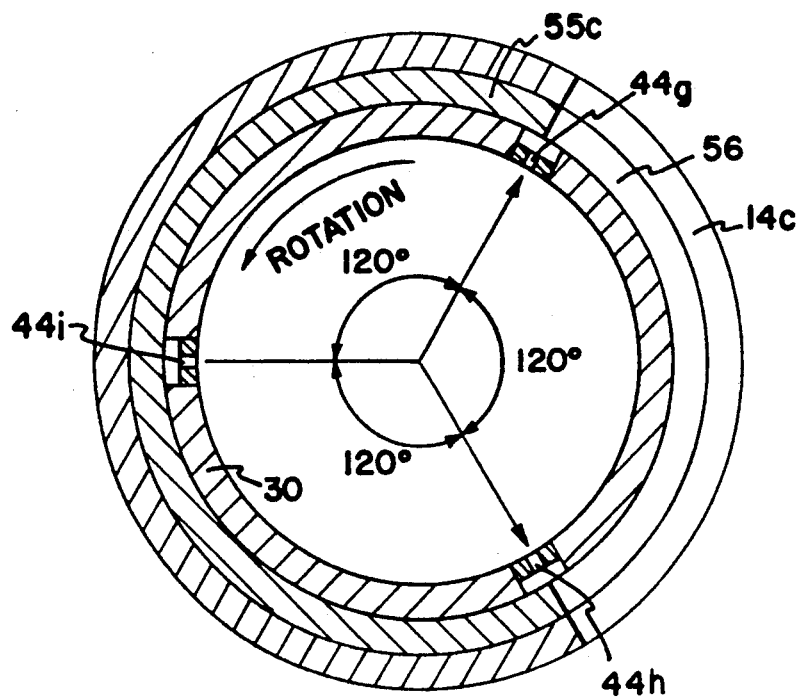

FIG. 7A illustrates the orientation of the nozzles 44g, 44h, and 44i with respect to the openings 14c and 56 at level 3. Nozzles 44g and 44h are partially blocked by the spacer 55c, while nozzle 44i is blocked allowing for partial pressurized flow of water through the openings 14c and 56. This FIG. illustrates transition of the nozzles 44g and 44h through the edge of the openings 14c and 56 where the flow from the nozzle 44g is in the process of being shut off and the flow from the nozzle 44h is being opened up.

Figure 7B:
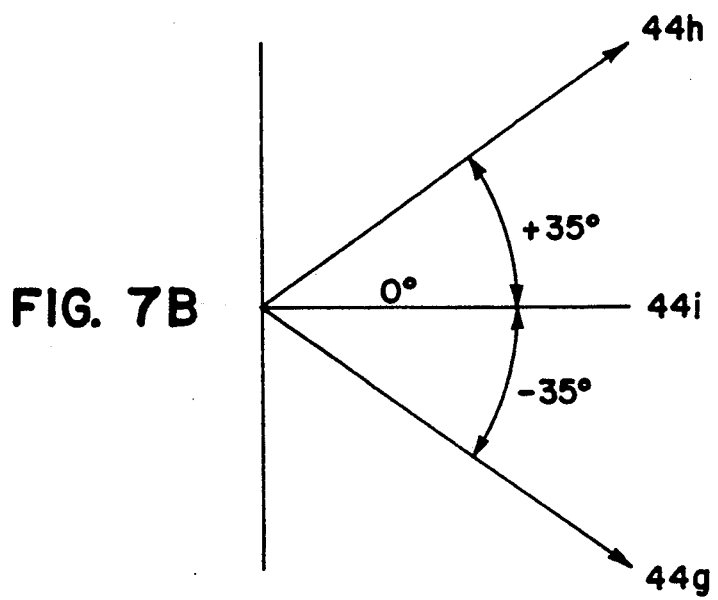

FIG. 7B illustrates the vertical or pitch components of pressurized water flow of each of the nozzles 44g, 44h and 44i as each is allowed to flow by disengagement from the inner surfaces of the spacer 55c. Nozzles 44g streams at −35°, nozzle 44h streams at +35°, and nozzle 44i streams at 0°.

Figure 8A:
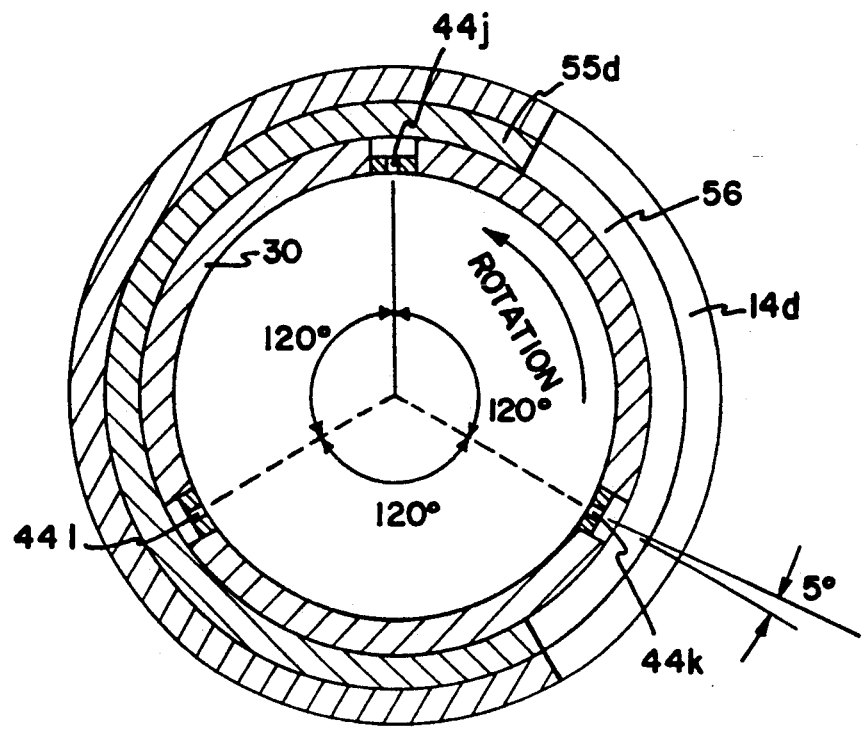

FIG. 8A illustrates the orientation of the nozzles 44j, 44k, and 44l with respect to the openings 14d and 56 at level 4. Level 4 is further divided into levels 4a and 4b where 4a is oriented with the upper portion of openings 14d and 56, and level 4b is oriented with the lower portion of openings 14d and 56. Nozzles 44j and 44l are aligned with level 4a and 4b, respectively, and are blocked by the spacer 55d, while nozzle 44k aligns with level 4b and is unblocked allowing for pressurized stream of water through the lower level 4b of openings 14d and 56. Rotation of the rotating tube 30 continues to allow nozzle 44l to become unblocked and spew pressurized water forth at the lower level 4b through the openings 14d and 56. With further rotation, pressurized water is allowed to flow from the nozzle 44j at upper level 4a through the openings 14d and 56.

Figure 8B:
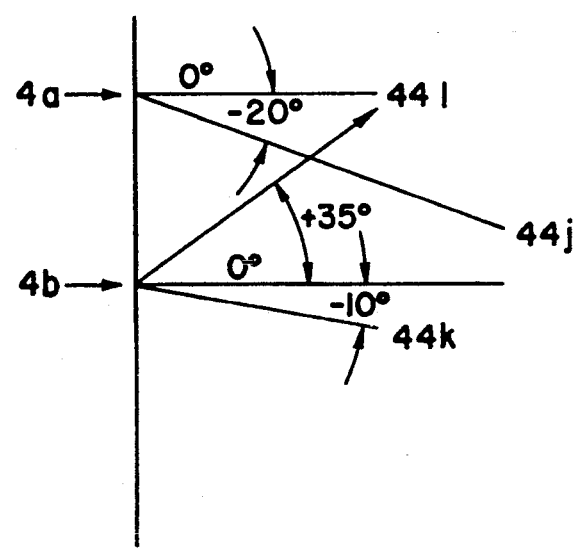

FIG. 8B illustrates the vertical or pitch components of pressurized water stream of each of the nozzles 44j, 44k and 44l at their respective level 4a and 4b as each is allowed to flow by disengagement from the inner surfaces of the spacer 55d. Nozzle 44j streams at −20° at level 4a, nozzle 44k streams at −10° at level 4b, and nozzle 44l streams at +35° at level 4b.

Figure 15:
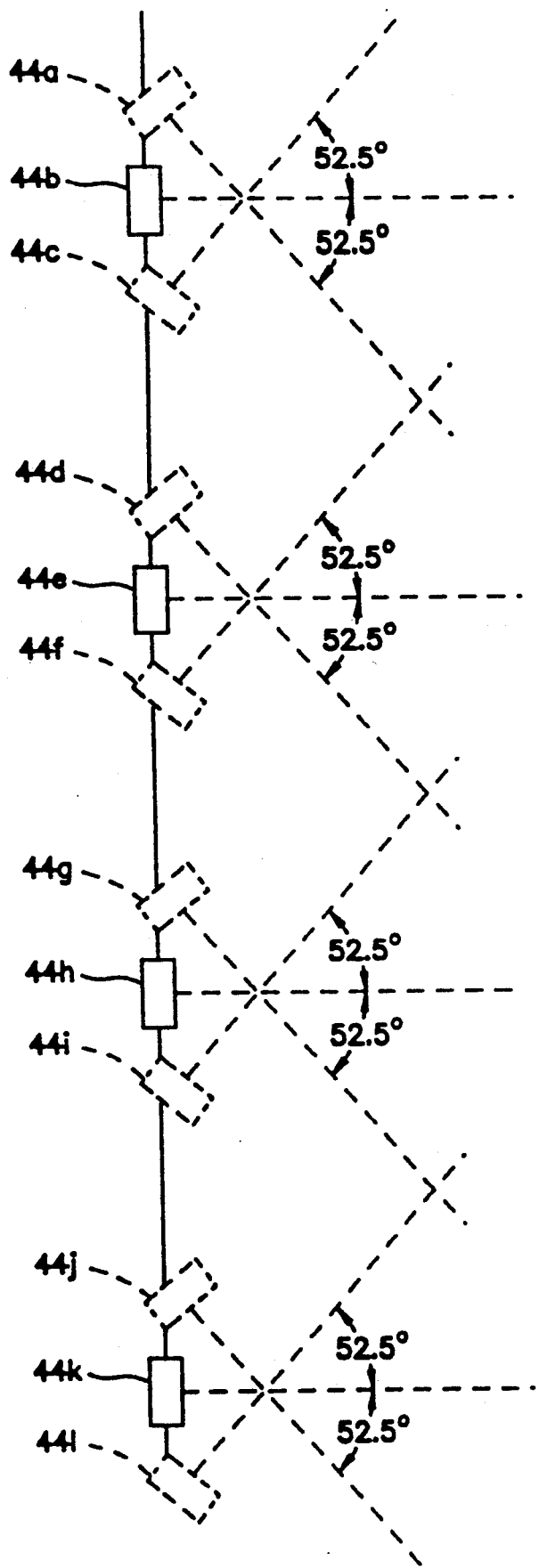
FIG. 15 illustrates an alternative arrangement of nozzles.

FIG. 15 shows an alternative arrangement of nozzles 44a through 44l. Nozzles 44a through 44l continue to be exposed through respective openings 14a through 14d as described above. Nozzles 44a through l are also radially spaced about nozzle tube 30 as described above. In the alternate configuration of the nozzles, however, nozzles 44a, d, g and j are now disposed proximate the top of openings 14a, 14b, 14c and 14d, respectively. Nozzle 44c, 44f, 44i, and 44l are now disposed proximate the bottom of openings 14a, 14b, 14c and 14d, respectively. And nozzles 44b, 44e, 44h and 44k are disposed between 44a and c, 44d and f, 44g and i, and 44j and l, respectively.

In this alternative arrangement of nozzles, nozzles 44a, 44d, 44g and 44j are pointed generally downward, nozzles 44d, 44e, 44h and 44k are pointed generally horizontally and nozzles 44c, 44f, 44i and 44l are pointed generally upwardly. In the preferred embodiment nozzles 44a, 44d, 44g and 44j point downwardly at approximately 52.5° from horizontal and nozzles 44c, 44f, 44i and 44l point proximately 52.5° upwardly from horizontal. In operation a jet stream of water will exit each nozzle 44a through l in the direction the nozzle is pointed. When the nozzle is exposed through its respective opening 14a, 14b, 14c or 14d.

Figure 16:
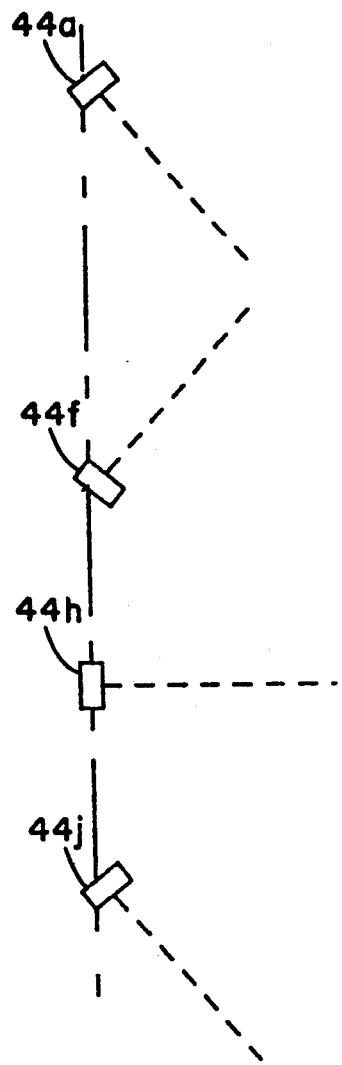
FIGS. 16-18 illustrate jet streams of water produced by the nozzle arrangement illustrated in FIG. 15.
Figure 17:
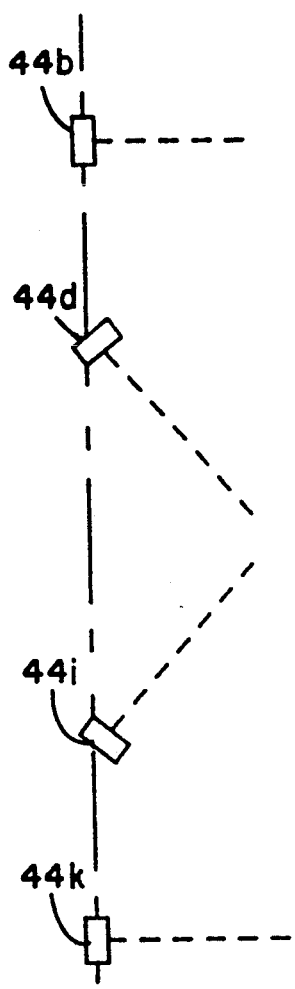
Figure 18:
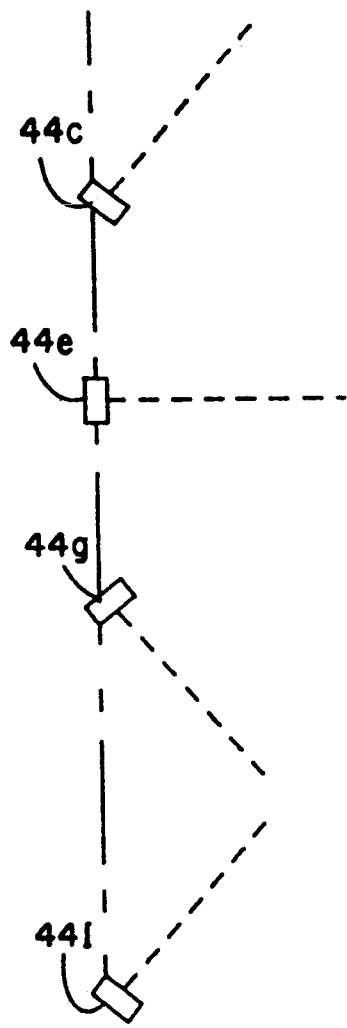

FIGS. 16 through 18 show the jet streams of water which will exit openings 14a, 14b, 14c and 14d as nozzle tube 30 rotates. In FIG. 16 nozzles 44a, 44f, 44h and 44j are exposed through opening 14a through 14d, respectively. After nozzle tube 30 has rotated approximately 120° nozzles 44b, 44d, 44i and 44k will be exposed through openings 14a through 14d, respectively as shown in FIG. 17. And as nozzle tube 30 continues to rotate through another 120° nozzles 44c, 44e, 44g and 44l will be disposed through openings 14a through 14d respectively as shown in FIG. 18. Following another 120° of rotation of nozzle tube 30 the nozzles disposed through opening 14a through d will again be as shown in FIG. 16.

In the preferred embodiment as nozzle tube 30 rotates the nozzles disposed through openings 14a through 14d are radially staggered somewhat. For example, as nozzle 44j emerges in opening 14d as shown in FIG. 16 nozzles 44a, 44f and 44h initially will not be disposed through respective opening 14a through 14c. Following a further rotation of nozzle tube 30 through approximately 1° to 10° nozzle 44h will emerge and be disposed through opening 14c. Then after a further rotation of approximately 1° to 10° nozzle 44f will be disposed through opening 14b and finally after another approximately 1° to 10° of rotation of nozzle tube 30 nozzle 44a will emerge to be disposed in opening 14a. At this point, the jet streams of water exiting the nozzles will appear as shown in FIG. 16. The nozzles 44j, 44h, 44f and 44a will then rotate out of the respective opening 14d through 14a in the order that they emerge from openings 14d through 14a, respectively. Approximately the same sequence of nozzles emerging into openings 14a through 14d and leaving openings 14d through 14a will be followed by nozzles 44k, 44i, 44d and 44b as shown in FIG. 17 and 44l, 44g, 44e and 44c as shown in FIG. 18. The pattern of jet streams of water thus created will tend to create a sweeping action forcing excavated material upward and out of the excavation.

Figure 9:
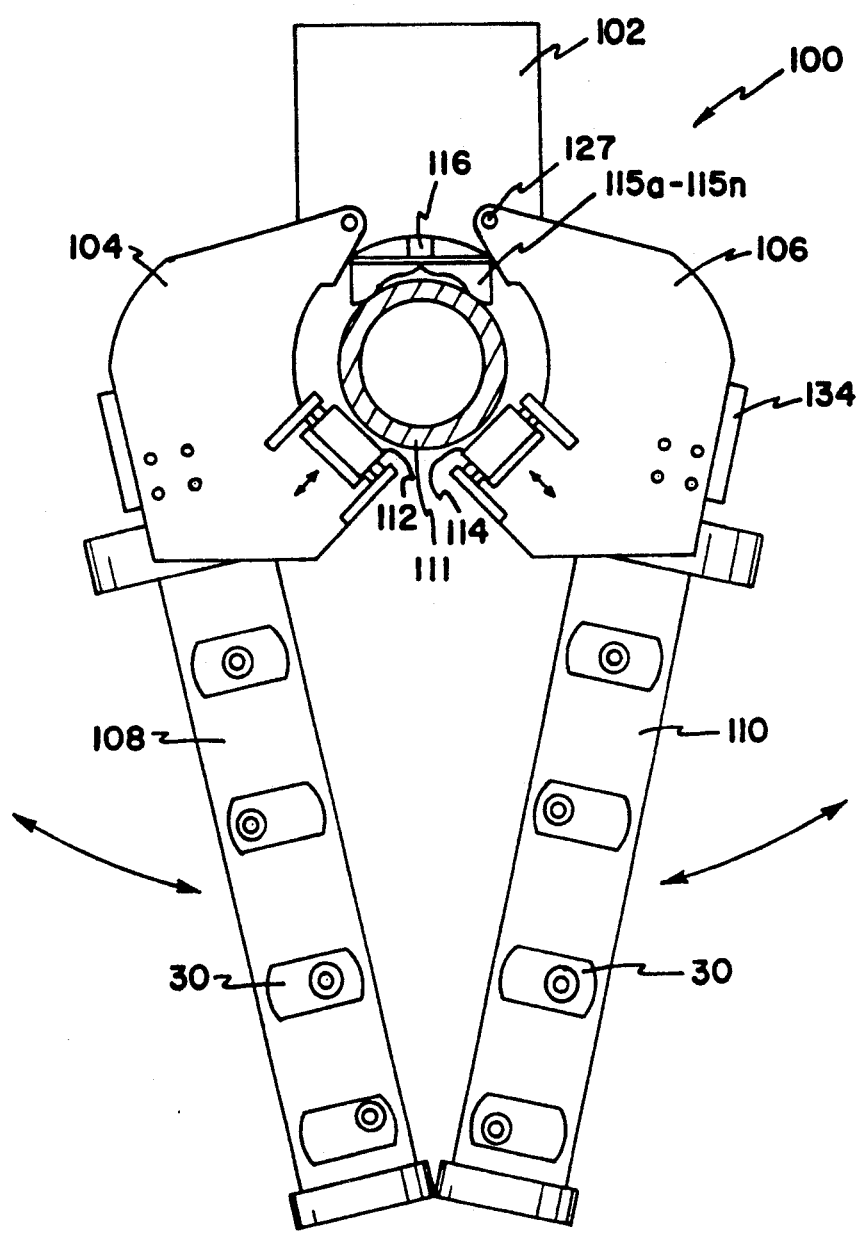
FIG. 9 illustrates a front view of a water jet system.

FIG. 9 illustrates a water jet system 100 including a carriage unit 102, two opposed spaced, pivotable mounting plates 104 and 106, and two jet legs 108 and 110 similar to jet leg 10. The jet legs 108 and 110 can secure to the plates 104 and 106, such as in cup arrangement, providing for literally dropping in the jet legs 108 and 110 into the cup. Adjustable rollers 112 and 114 space the jet legs 108 and 110 from a pipe 111, and at the same time, also provide for rolling over any anodes or obstructions along the length of the pipe The carriage 102 includes traction cushion blocks 115a-115n mounted onto an endless chain 116, which rotates about two sprockets 118 and 120 of FIG. 16. The water jet system 100 can follow a curved pipeline along its path and centers the ditch along the vertical axis of the pipeline.

Figure 10:
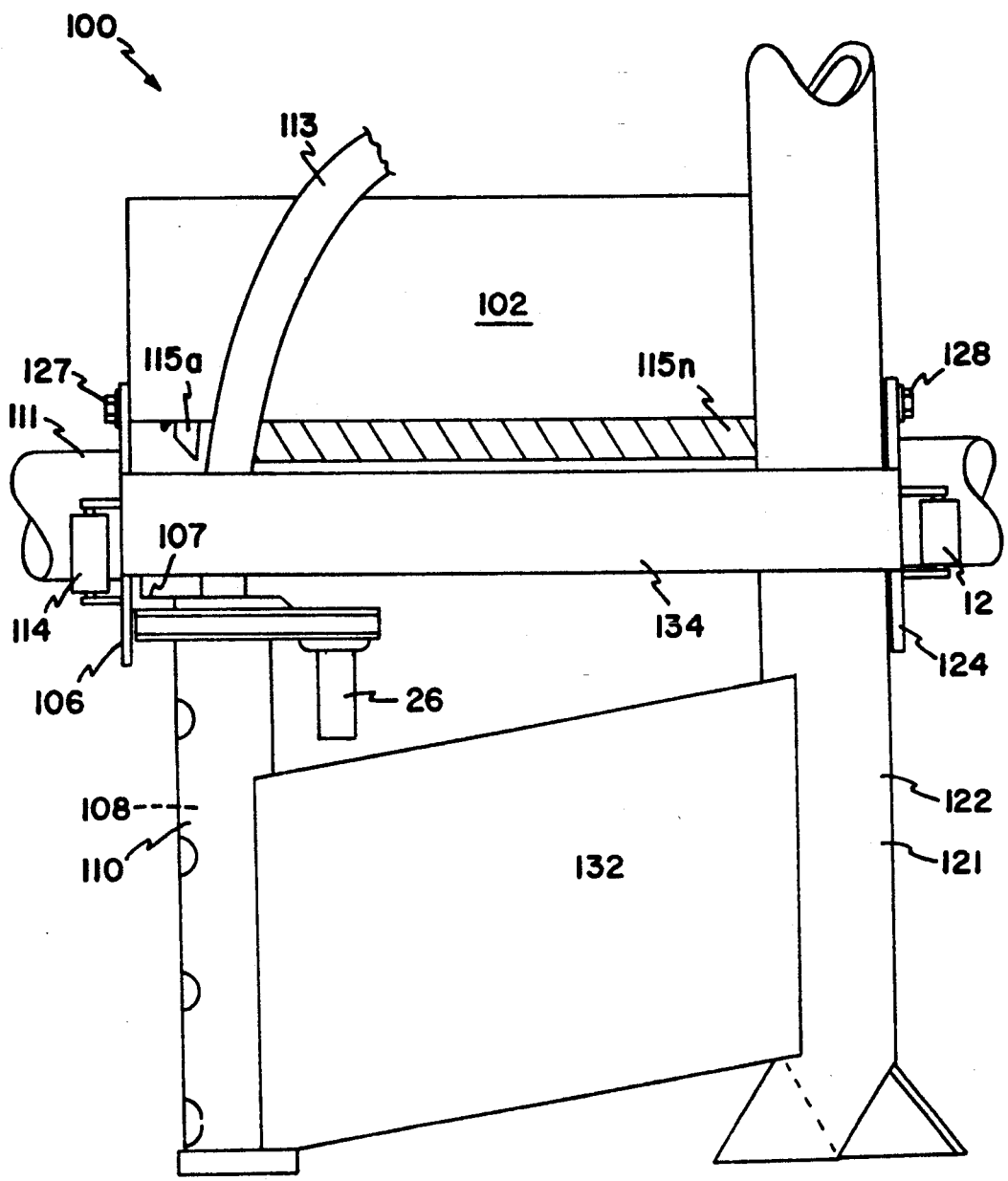
FIG. 10 illustrates a side view of the water jet system.

FIG. 10 illustrates a side view of a water jet system 100 for burying pipe, including the water jet 110 and the roller 114 on the plate 106. Water jets 110 and 108 and venturi 122 and 121 are propelled along the pipe 111 for water trenching and debris evacuation along the path of the pipe A venturi tube 122 secures to a plate 124 with roller 126, and pivots about a nut and bolt assembly 128. A corresponding plate 106 pivots about a nut and bolt assembly 127. Water jets 108 and 110 secure to the plate 106 via an angle bracket 107. A substantially rectangular plate 132 connects between the cup carrying the water jet 110 and the venturi tube 122. An air venturi introduces air at the bottom of the venturi tube 122, and as the air rises through the water column it expands and accelerates and creates a void in the tube, and makes a vacuum effect at the lower end. A water eductor introduces a directed stream of water at the bottom of the tube, going towards the top, and accelerates the water column in the tube, and creates a water vacuum at the bottom, causing suction at the bottom. The system contemplates water eductors or air venturi, whichever is deemed suitable at the time as required. The venturi tube 122 forces material loosened by the water jet 110 up through the venturi tube 122 for subsequent discharge behind and away from the pipe. Water under pressure is feed to the water jet 110 through a hose 113. Another rectangular bar member 134 aligns between plate 106 and plate 124 to cause rollers 114 and 126 to move in concert With each other to rest on the pipe 111. The opposing side of the water jet system 100 is constructed in the same manner and is a mirror image of the side illustrated in this FIG.

Figure 11:
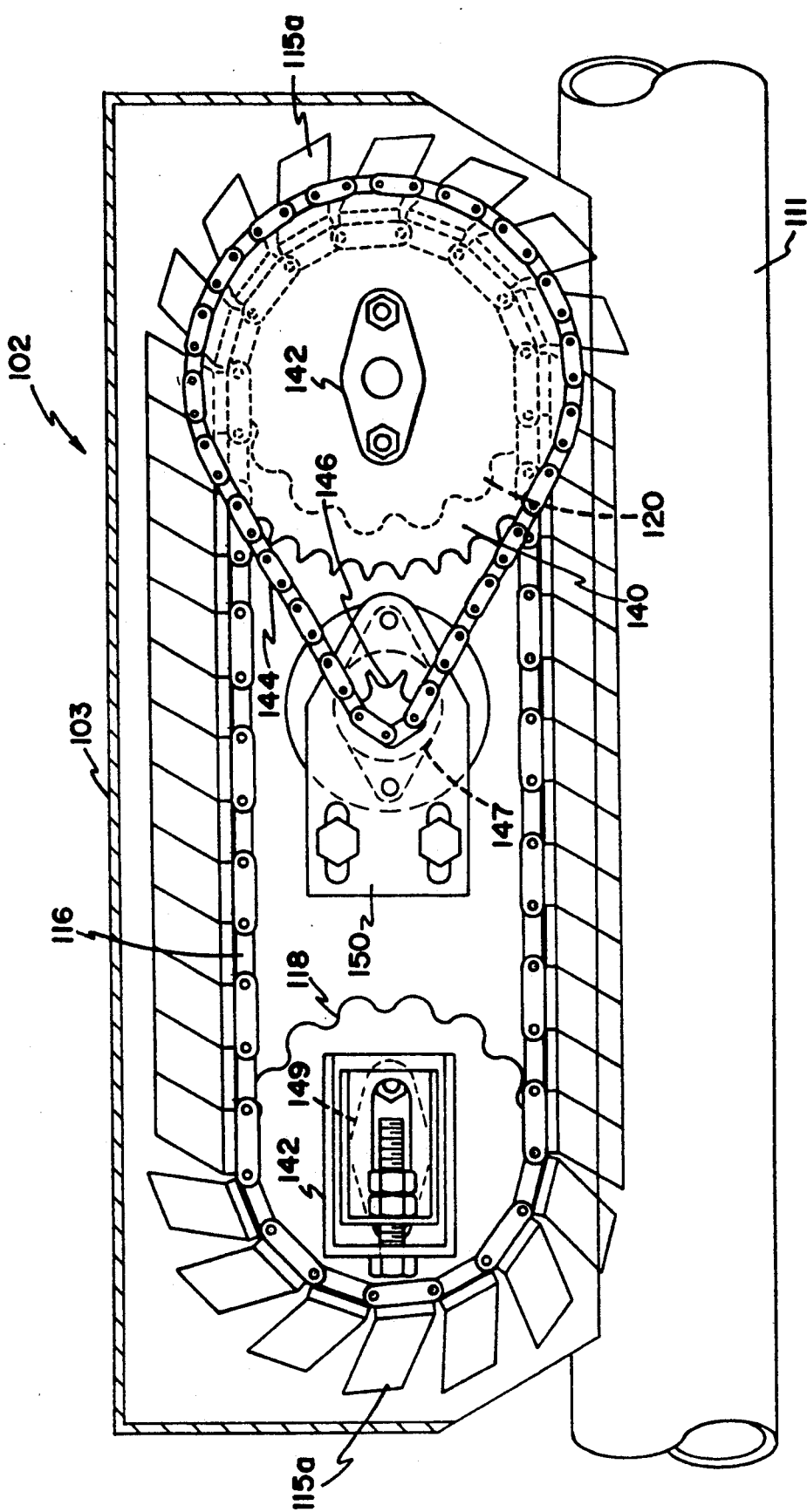
FIG. 11 illustrates a plan view in partial cross section of the carriage unit tracking device.

FIG. 11 illustrates a plan view in partial cross section of the carriage unit 102 including a housing 103, two endless chain sprockets 118 and 120 about which the endless chain 116 carries the traction cushion blocks 115a-115n where all numerals correspond to those elements previously described. The traction cushion blocks 115a-115n of composite or compound material are cross sectioned to maximize contact on the pipe 111 at substantially two opposing points, at the 2 o'clock position and 10 o'clock position of the circumference of the pipe as illustrated in FIG. 9. The compound material traction cushion blocks 115a-115n may be contoured to any desired shape or size to accommodate different sized or shaped pipes or objects. The endless chain sprocket 120 and a drive sprocket 140 secure to an appropriately bearinged stationary axle 142. A drive chain 144 aligns over and about the drive sprocket 140 and a motor drive sprocket 146. A hydraulic motor 147, whose speed can be varied by hydraulic control, drives the motor drive sprocket 146, the drive sprocket 140, the stationery axle 142, the endless chain sprocket 120 and the endless chain 116 with the attached traction cushion blocks 115a-115n. The endless chain sprocket 118 aligns over appropriately bearinged axle 149 which is secured to a tension adjuster 148 for tightening and tensioning of the endless chain 116. The motor 147 is secured to an adjustable plate 150. The carriage unit 102 relies on alignment of the contoured traction cushion blocks 115a-115n upon the pipe and gravitational forces upon the carriage unit 102 for tracking upon the pipe 111 instead of prior art opposing side members aligned about a pipeline which squeezingly engages the pipe. The compounded contouring of the traction cushion blocks 115a-115n allows them to climb over irregularities of the pipeline, such as anode components. Minimal force is applied to the pipe allowing for safe jetting about a pipeline. It is noted that the rotational speed of the nozzles 44a-44j and the carriage unit speed are separately controlled and independent of each other.

Figure 12:
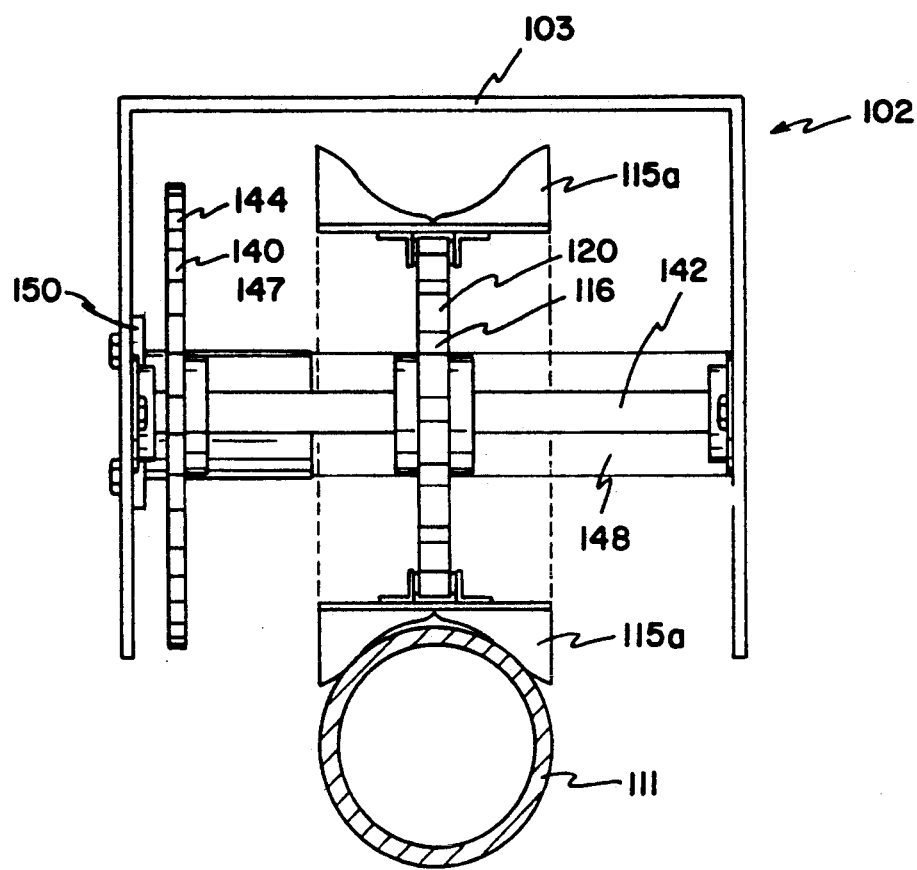
FIG. 12 illustrates a front plan view of the carriage unit.

FIG. 12 illustrates a front plan view of the carriage unit 102 and the traction cushion blocks 115a-115n where all numerals correspond to those elements previously described. The traction cushion blocks 115a-115n are molded of a desirable compound so as to gain traction along the pipe 111 and yet avoid damaging the pipe coating or line coating 111.

MODE OF OPERATION

The water jet system is positioned about a pipe. Slings, come alongs, or hydraulic structures can be rigged to spread the plates apart so that the jet legs encompass the pipe as illustrated in FIG. 9. Hydraulics are coupled to the hydraulic motor 26 to rotate the rotating tube 30. Hydraulics are also coupled to the carriage motor 147 to rotate the drive sprocket 140. High pressure water is connected to the jet legs 108-110 for creating jet streams to forcibly exert pressure to water blast the lake, river, gulf or ocean bottom, such as sand, silt, mud or hardened, calcified silt, etc. The traction cushion blocks 115a-115n on the carriage unit 102 moves forward carrying the jet legs 108-110 forward over the pipe or anodes. The speed of the traction cushion blocks 115a-115n on the carriage unit 102 can be adjusted. The rotating action of the jet legs 108-110 can also be adjusted. The water jet system 100 is supported from a work vessel, and hydraulically powered and water jet powered from hydraulic systems and high pressure water systems on the work vessel. The debris removal venturi are supplied water or air from the work vessel. A video camera system can be mounted on the carriage on a three-dimensional mount for remote control from the work vessel for monitoring of all aspects of the underwater trenching operation. The design of the jet leg is flexible so as to allow for various jetting pressures.

DESCRIPTION OF AN ALTERNATIVE EMBODIMENT

Figure 13:
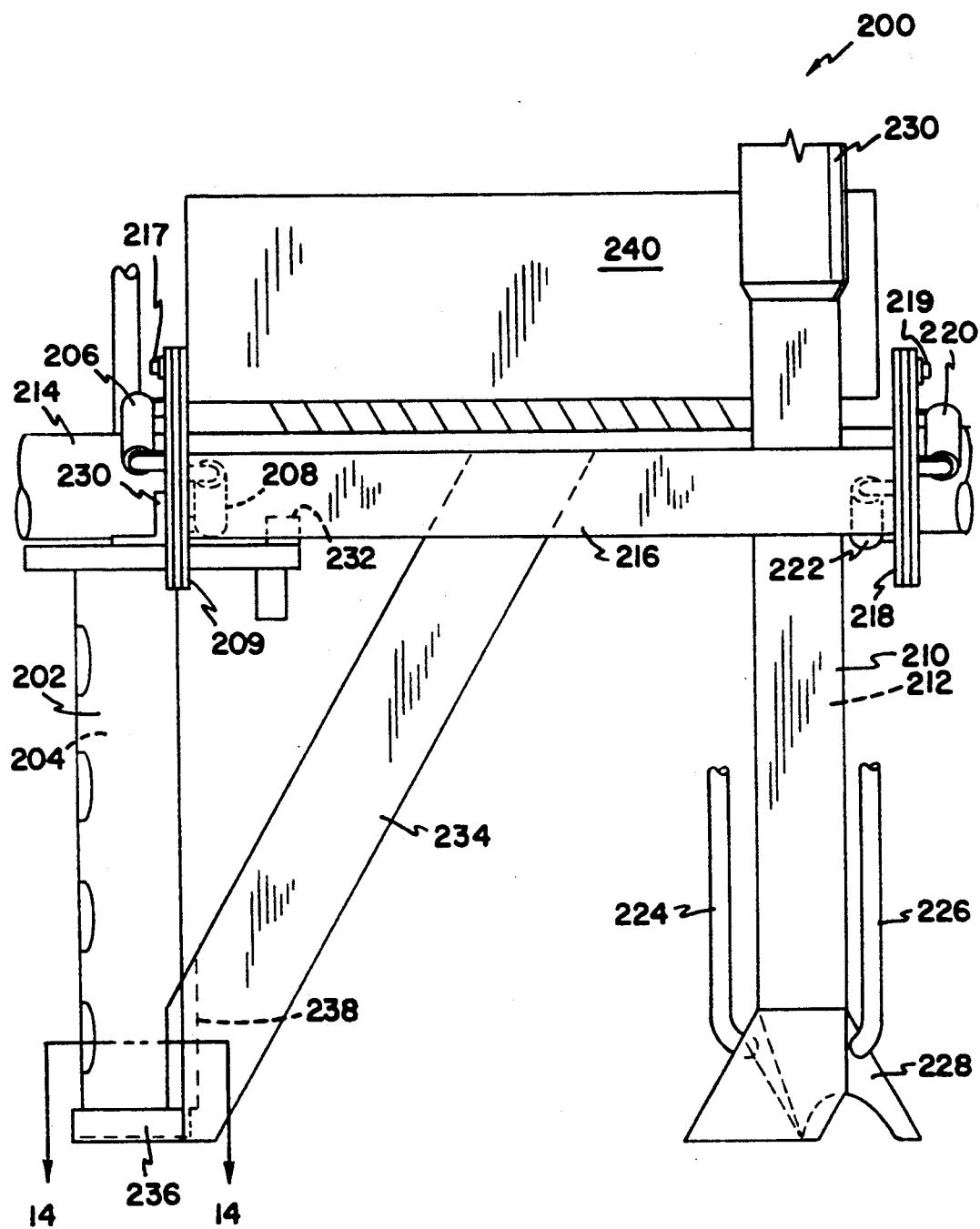
FIG. 13, an alternative embodiment, illustrates a side view of a water jet system; and, FIG. 14 illustrates a cross-sectional view along line 14—14 of FIG. 13.

FIG. 13, an alternative embodiment, illustrates a side view of a water jet system 200 for burying pipe, including the water jets 202 and 204 and a plurality of rollers including rollers 206 and 208 secured to a plate 209, where all numerals correspond to those elements previously described. Water jets 202 and 204 and venturi 210 and 212 are propelled along the pipe 214 for water trenching and debris evacuation along the path of the pipe 214. A venturi tube 210 secures to a channel member 216. The channel member 216 aligns between a left vertical plate 209 and a right vertical plate 218 to cause the described rollers to move in concert with each other. Plates 209 and 218 are compositely layered. A plurality of rollers, including rollers 220 and 222, secure to the right plate 218. The left and right plates pivot about nut and bolt assemblies 217 and 219, respectively. The pluralities of rollers, including rollers 206, 208, 220 and 222 encompass the pipe 214 for positive rolling securement to the pipe 214. The rollers may be replaced with appropriately sized diameter rollers to accommodate various pipe or cable sizes. Venturi tubes 210 and 212 each have eductor supply pipes 224 and 226 plumbed to a widened opening 228. Either air or water can be used in the supply eductor pipes to create a venturi effect for removal of the debris from the site. The main body of the venturi is rectangular in shape and connects to a evacuation tube 230.

The water jet 202 secures to the plate 209 by suitable means via a common bracket 230 and another bracket 232 which is suitably secured to the channel member 216. A brace 234 suitably attaches and extends downwardly and to the left from the channel 216. A cup 236 secures to the lower end of the brace 234 and serves as a rest for the water jet 202. Extending vertically from the cup 236 is a channel member 238 which supports and aids in structural stability of the cup. The cup is cylindrical in shape and accommodates the bottom end of the water jet 202 as illustrated. A carriage unit 240 aligns over the pipe 214. The opposing side of the water jet system 200 is constructed in the same manner and is a mirror image of the side illustrated in this FIG.

Figure 14:
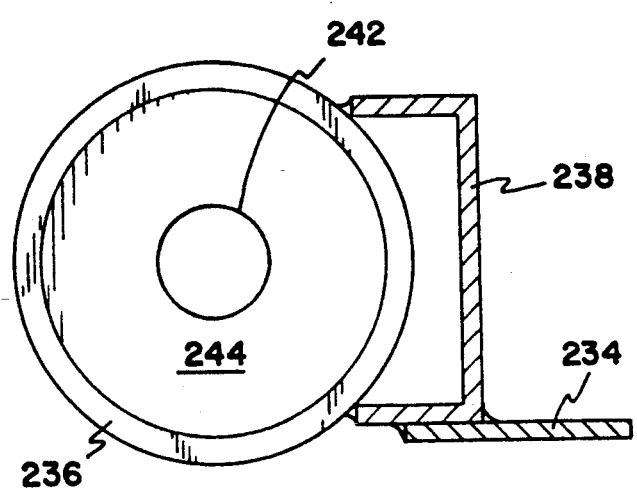

FIG. 14 illustrates a cross-sectional view along line 14—14 of FIG. 13 where all numerals correspond to those elements previously described. A central hole 242 in the floor 244 of the cup 236 is included to allow access to an inspection cover on the water jet 202.

Various modifications can be made to the present invention without departing from the apparent scope hereof.

We claim:
1. A water jet leg for trenching underwater comprising:
   a. an enclosed housing having a surface surrounding a central axis of said housing and having at least one opening formed through said surface with said opening only partially surrounding said axis;
   b. a hollow member disposed within said housing and mounted for rotation about said axis, said hollow member having a nozzle secured thereto for rotation therewith, said nozzle communicating with an interior of said hollow member, said nozzle disposed to be exposed through said opening during only a portion of angular displacement of said nozzle about said axis, said nozzle sealed from said opening during a remainder of said angular displacement;
   c. means for rotating said member relative to said housing about said axis; and,
   d. means for supplying liquid into said member under pressure for ejecting a stream through said nozzle when said nozzle is aligned with said opening.
2. A water jet lag system according to claim 1 wherein said nozzle is disposed to project fluid from said member at an angle relative to a radius line from said axis.
3. A water jet system comprising:
   a. a vertical cylindrical housing with a closed end and a plurality of spaced openings along a longitudinal length of said housing;
   b. a hollow cylindrical member and means for rotatably mounting said member in said vertical cylindrical housing for rotation about said cylindrical axis relative to said housing, a plurality of nozzles carried on said member for rotation therein, said nozzles disposed to be exposed through an opening during at least a portion of an angular displacement of said member about said axis and said nozzle sealed from said opening during a remainder of said angular displacement;
   c. means for rotating said hollow cylindrical member about said axis; and,
   d. means for supplying liquid under pressure into said hollow cylindrical member for forming jet streams of water exiting said nozzles.
4. A water jet system according to claim 3 wherein said nozzles include means for projecting a fluid from said member at an angle relative to a radius line extending from said axis.
5. A water jet leg for trenching a pipeline, flexible pipeline or cable underwater comprising:
   a. a vertical cylindrical housing with a closed end and a plurality of spaced openings along a longitudinal length of said housing, each of said openings extending from first to second ends in a circumferential arc partially surrounding a cylindrical axis of said housing;

b. a hollow cylindrical member disposed coaxially within said housing for rotation about said axis, said member having a plurality of nozzles disposed along a longitudinal length of said member and with of said openings for said nozzle to be exposed through said opening during a portion of an angular displacement of said member about said axis;

c. said housing sealed against said member for liquid under pressure to be restrained from flowing through said nozzle except when said nozzle is exposed through said opening;

d. means for rotating said hollow cylindrical member about said axis; and, e. means for supplying liquid under pressure into said hollow cylindrical member for forming jet streams of water exiting said nozzles.

6. The water jet leg of claim 5 comprising four of said openings spaced along said longitudinal length of said housing.

7. The water jet leg of claim 5 comprising three nozzles aligned for each of said openings.

8. The water jet leg of claim 7 wherein said nozzles are spaced at 120°.

9. The water jet leg of claim 5 wherein said nozzles at an opening adjacent a distal end of said housing are at different levels within vertical height of said lowest opening for generating a V-groove in a trench.

10. The water jet lag according to 5 wherein said nozzles include means for projecting a fluid from said member at an angle relative to a radius line extending from said axis.

11. The water jet lag according to claim 10 wherein said plurality of nozzles are provided with differing angles of projection.

12. A tracker for burying pipe, flexible pipe or a cable by water jet legs comprising:

a. a frame including opposing sides spaced apart a distance sized for said pipe to pass between said sides;

b. two spaced axles between said opposing sides and extending transverse to a length of a pipe between said sides, a sprocket on each of said axles;

c. an endless chain engaged about said sprockets with a leg of said chain opposing said length of said pipe and generally parallel thereto;

d. a traction cushion block attached to each chain link of said endless chain, said cushion having a surface opposing and abutting said length of said pipe in force transmitting relation when said link is moved to said leg;

e. means for driving one of said sprockets; and, f. means for supporting two opposing water jet legs from opposing sides of said tracker.

13. The tracker of claim 12 including means for supporting two opposing eductor means from opposing sides of said tracker and spaced from water jet legs.

14. The tracker of claim 12 including mounting plate means to pivot said legs independently with respect to each other.

15. The tracker of claim 12 including means to pivot said eductor means independently with respect to each other.

16. A system for burying a pipeline, flexible pipeline or cable comprising:

a. a tracker for water jet legs comprising a frame including opposing sides, two spaced axles between said opposing sides, a sprocket on each of said axles, an endless chain engaged about said sprockets, a geometrically configured traction cushion block attached to each chain link of said endless chain, means for driving one of said sprockets, and means for supporting two opposing water jet legs from opposing sides of said tracker; and, b. a water jet leg comprising a vertical cylindrical housing with a closed end and a plurality of spaced openings along a longitudinal length of said housing, internal cylindrical spacers about an internal circumference between edges of each of said openings, a hollow cylindrical member with a plurality of nozzles substantially aligned at a height of each of said openings, said nozzles including at least one hole at an angle of 0°-180° in the x, y, and z axis, means for rotating said hollow cylindrical member and affixed to said vertical cylindrical housing, and means for supplying liquid under pressure into said hollow cylindrical member for forming jet streams of water exiting said nozzles at predetermined angles.

17. The system of claim 16 including eductor for clearing trenched debris.

18. The system of claim 16 including air means to power said eductor means.

19. The system of claim 16 including water means to power said eductor means.

20. A water jet system, comprising:

a. a vertical cylindrical housing with a closed end and at least one opening, said opening having a top and a bottom, and said housing having a longitudinal axis;

b. a hollow cylindrical member and means for rotatably mounting said member in said vertical cylindrical housing for rotation about said axis relative to said housing;

c. at least three nozzles carried on said member for rotation therewith, said nozzle disposed to be exposed through said opening during at least a portion of an angular displacement of said member about said axis, a first of said nozzles being disposed proximate said top of said opening, said first nozzles pointing downward, a second of said nozzles being disposed proximate said bottom of said opening, said second nozzle pointing upward, and a third of said nozzles being disposed between said first and second nozzles, said third nozzle pointing proximately horizontally;

d. said nozzle sealed from said opening during a remainder of said angular displacement;

e. means for a rotating said hollow cylindrical member about said axis; and f. means for supplying liquid under pressure into said hollow cylindrical member for forming jet streams of water exiting said nozzles, whereby a first of said jet streams exiting said first nozzle is directed downward, a second of said jet streams exiting said second nozzle is directed upward, and a third of said jet streams exiting said third nozzle is directed proximately horizontal.

21. A water jet system in accordance with claim 20, wherein each said nozzle is proximately equally spaced from each other horizontally.

22. A water jet system in accordance with claim 20, wherein at least one of said nozzles projects a jet stream of water at a horizontal angle relative to a radius line extending from said axis.

23. A water jet system in accordance with claim 20, wherein said first nozzle points downward relative to horizontal proximately 52.5° and said second nozzle points upward relative to horizontal 52.5°.

* * * * *

UNITED STATES PATENT AND TRADEMARK OFFICE
CERTIFICATE OF CORRECTION

PATENT NO. : 5,288,172

DATED : February 22, 1994

INVENTOR(S) : Gerald G. Reuhl

It is certified that error appears in the above-identified patent and that said Letters Patent is hereby corrected as shown below:

Column 4, line 57, "3" should read --38--.

Column 7, line 53, insert --111-- after the word "pipe".

Column 7, line 65, insert --111-- after the word "pipe".

Column 8, line 53, insert --111-- after the word "pipe".

Column 10, line 38, "lag" should read --leg--.

Column 11, line 9, "with" should read --width--.

Column 11, line 30, "lag" should read --leg--.

Column 11, line 34, "The" should read --A--.

Column 11, line 34, "lag" should read --leg--.

Signed and Sealed this

Thirtieth Day of August, 1994

*Attest:*

BRUCE LEHMAN

*Attesting Officer*  *Commissioner of Patents and Trademarks*